United States Patent [19]  [11] Patent Number: 4,622,059
Brown  [45] Date of Patent: Nov. 11, 1986

[54] APPARATUS FOR CONTROLLING TEMPERATURE WITHIN A FOREHEARTH

[75] Inventor: George W. Brown, Windsor, Conn.

[73] Assignee: Emhart Industries, Inc., Farmington, Conn.

[21] Appl. No.: 785,424

[22] Filed: Oct. 8, 1985

[51] Int. Cl.$^4$ .............................................. C03B 5/24
[52] U.S. Cl. ...................................... 65/160; 65/136; 65/162; 65/337; 65/346
[58] Field of Search ................. 65/136, 137, 162, 346, 65/347, 337, 160

[56] References Cited

U.S. PATENT DOCUMENTS

| 3,582,310 | 6/1971 | Avery et al. | 65/346 |
| 3,600,149 | 8/1971 | Chen et al. | 65/162 |
| 3,915,682 | 10/1975 | Chotin | 65/162 X |
| 4,028,083 | 6/1977 | Patznick et al. | 65/162 X |
| 4,375,368 | 3/1983 | Stevenson | 65/162 X |

Primary Examiner—Arthur Kellogg
Attorney, Agent, or Firm—Arthur B. Moore

[57] ABSTRACT

A temperature control system for a forehearth, said forehearth for thermally conditioning molten glass to be fed to a glassware forming machine, and being divided into a plurality of zones. Each of the forehearth zones is provided with devices for monitoring the temperature of molten glass within the zone, and apparatus for selectively heating the glass. A microprocessor-based time sharing system controls the temperature of the plurality of zones, using adaptive control loops. Each zone is assigned a time period for monitoring temperature and taking appropriate corrective action. Temperature adjustments may be made independently zone-by-zone, or in cooperation, and other physical parameters may be taken into account such as glass viscosity or combustion pressure. Certain time-sharing periods may be associated with monitoring and displaying functions only.

13 Claims, 7 Drawing Figures

APPARATUS FOR CONTROLLING TEMPERATURE WITHIN A FOREHEARTH

BACKGROUND OF THE INVENTION

The present invention relates to method and apparatus for controlling the operating temperatures within a glass forehearth, and in particular to a versatile, cost-efficient computer control system therefor.

The control system of the present invention is designed to be utilized in a forehearth for thermally conditioning molten glass received from a glass melting furnace, to be fed to a glassware forming machine. Such forehearths typically include an elongated refractory channel which is divided into a series of sections or zones, and are designed to bring the glass to a reduced temperature level and to achieve approximate thermal homogeneity, thereby providing a suitable viscosity for the forming process. These forehearths incorporate a plurality of burners, electrodes, or other heat input means spaced along their sides to replace heat lost to the refractory channel walls, and may in addition include one or more conduits for cooling air to selectively remove heat from portions of the molten glass.

A variety of electronic control systems have been devised for glass forehearth temperature control. Such systems typically include one or a plurality of temperature sensors, for measuring atmospheric temperatures or subsurface temperatures of the molten glass, together with a regulator for controlling the action of the heating (and possibly cooling) devices associated with the forehearth in response to sensor feedback and operator input. Where such forehearth control systems include a plurality of transducer-regulator subsystems, each associated with an individual section or zone of the forehearth, these systems have provided greater precision of control at considerable additional expense. There is a practical need for an improved control system which enjoys the advantages of versatile, precise control of forehearth temperatures over a plurality of zones, with greater economy of design.

Accordingly, it is a paramount object of the invention to achieve improved electronic control systems for temperature control in a glass conditioning forehearth. Such systems should provide precise, efficient thermal control over a plurality of forehearth zones.

A related object is to simplify the electronic hardware design of such control systems, thereby yielding cost savings and other advantages.

Still another object of the invention is to achieve rapid, efficient response to disruptive thermal conditions within the forehearth.

SUMMARY OF THE INVENTION

The above and additional objects are successfully realized in the forehearth temperature control system of the invention, which controls the temperature of molten glass in a plurality of zones of a refractory channel using time sharing among plurality of control loops. The principal functional elements in the control loops are temperature sensors associated with each zone; heaters having variable heat energy output, such heaters being associated with respective temperature sensors; and a digital computer temperature controller. Optionally, the forehearth may also include one or more variable output cooling devices for selectively cooling the molten glass.

The temperature controller of the invention includes a temperature comparing circuit for comparing the outputs of the temperature sensors with corresponding set-point signals, and in response to this comparison producing heater adjustment signals. The heater adjustment signals are fed back to corresponding heater controls to adjust the heater output if required. In accordance with the present invention, the controller includes a time division multiplexing system for defining a control cycle and for subdividing the control cycle into a plurality of time segments each of which is associated with a given control loop (i.e. sensor output, set-point value, and heater adjustment signal). This system interconnects the temperature comparing circuit with predefined sensor readings and set-point signals, and feeds the heater adjustment signals to predefined heaters, over the various time segments.

In the preferred embodiment of the invention, the forehearth sensors are comprised of control-loop sensors and non-control loop sensors. While the outputs of control loop sensors are processed by the temperature controller to regulate the heat output of the heaters (and possibly the operation of cooling devices), the non-control loop sensors are monitored and displayed without affecting the heating or cooling devices. In such a system the control cycle is subdivided into control-loop time segments, which are dedicated to control loop processing, and non-control loop segments, which are dedicated to monitoring and display of the output of corresponding non-control-loop sensors.

In a preferred design of the temperature controller, the temperature comparing circuit includes a subcircuit for providing a difference signal representative of the difference between a sensor output and a set-point value, and a control loop processing portion for processing this difference signal to derive a signal for adjusting a heater or cooling device. The control loop processing circuit may also receive and process non-temperature sensor outputs in accordance with a particular processing algorithm.

BRIEF DESCRIPTION OF THE DRAWINGS

The above and additional aspects of the invention are illustrated in the detailed description of the preferred embodiment which follows, which should be referenced in conjunction with the drawings in which.

DETAILED DESCRIPTION

Reference should now be had to FIGS. 1-7 for a detailed description of a glass forehearth temperature control system in a preferred embodiment of the invention. The control system 10 (FIG. 1) is illustrated in the context of a preferred construction of forehearth 50 as disclosed in commonly assigned U.S. patent application Ser. No. 559,160, filed Dec. 7, 1983. As best seen in the transverse sectional view of FIG. 2, forehearth 50 includes a generally V-shaped channel or trough 52 of refractory material, mounted in metallic support structure 54 with insulating bricks 56 positioned between the trough 52 and support structure 54. Forehearth 50 is made up of a plurality of cooling zones, two of which are shown at 60 and 62 in FIG. 1. An equalizing zone 64 is provided at the forward end of cooling zone 62, to which zone 64a feeder bowl 66 is attached.

Figure 2:
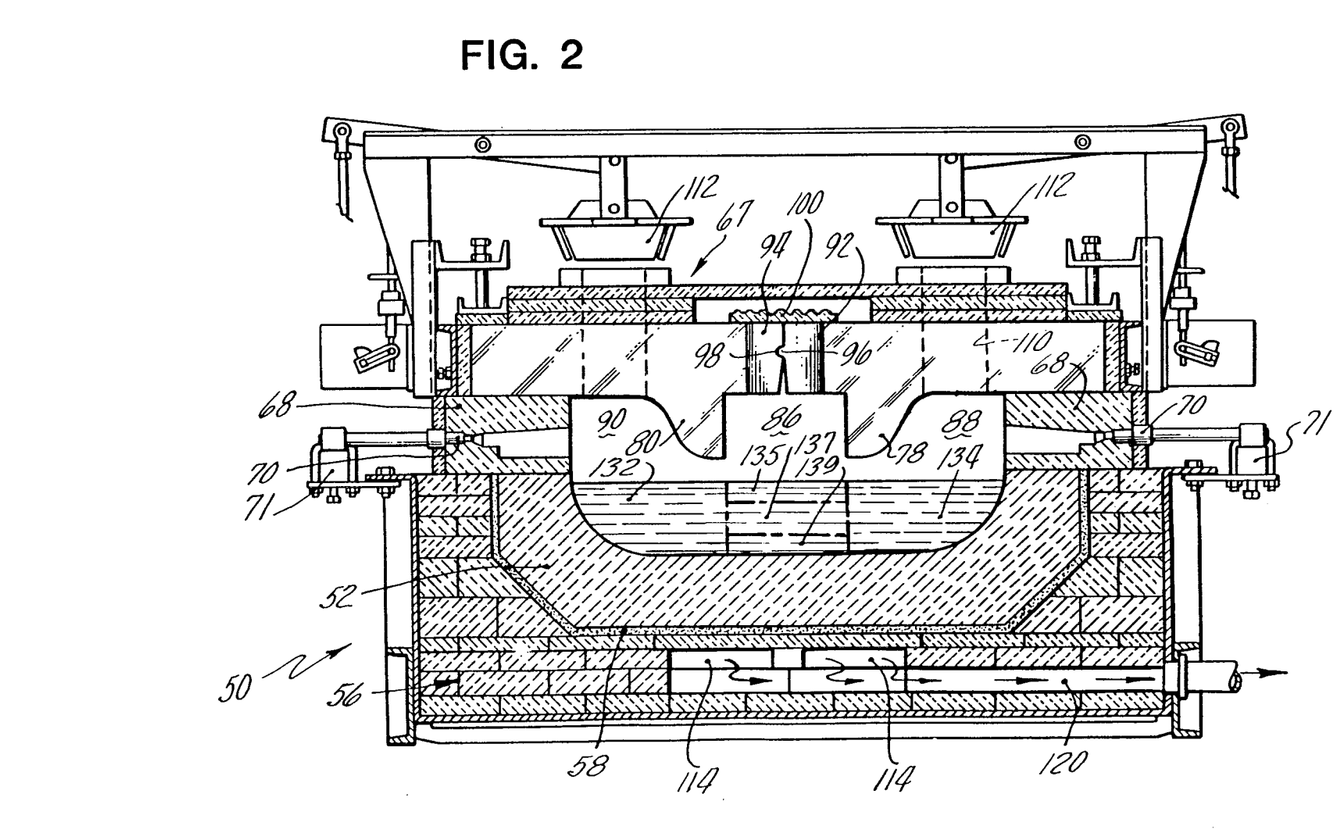
FIG. 2 is a transverse sectional view of a forehearth cooling system, with associated heating and cooling devices, in accordance with commonly assigned U.S. patent application Ser. No. 559,160, filed Dec. 7, 1983 now U.S. Pat. No. 4,552,579.
Figure 3:
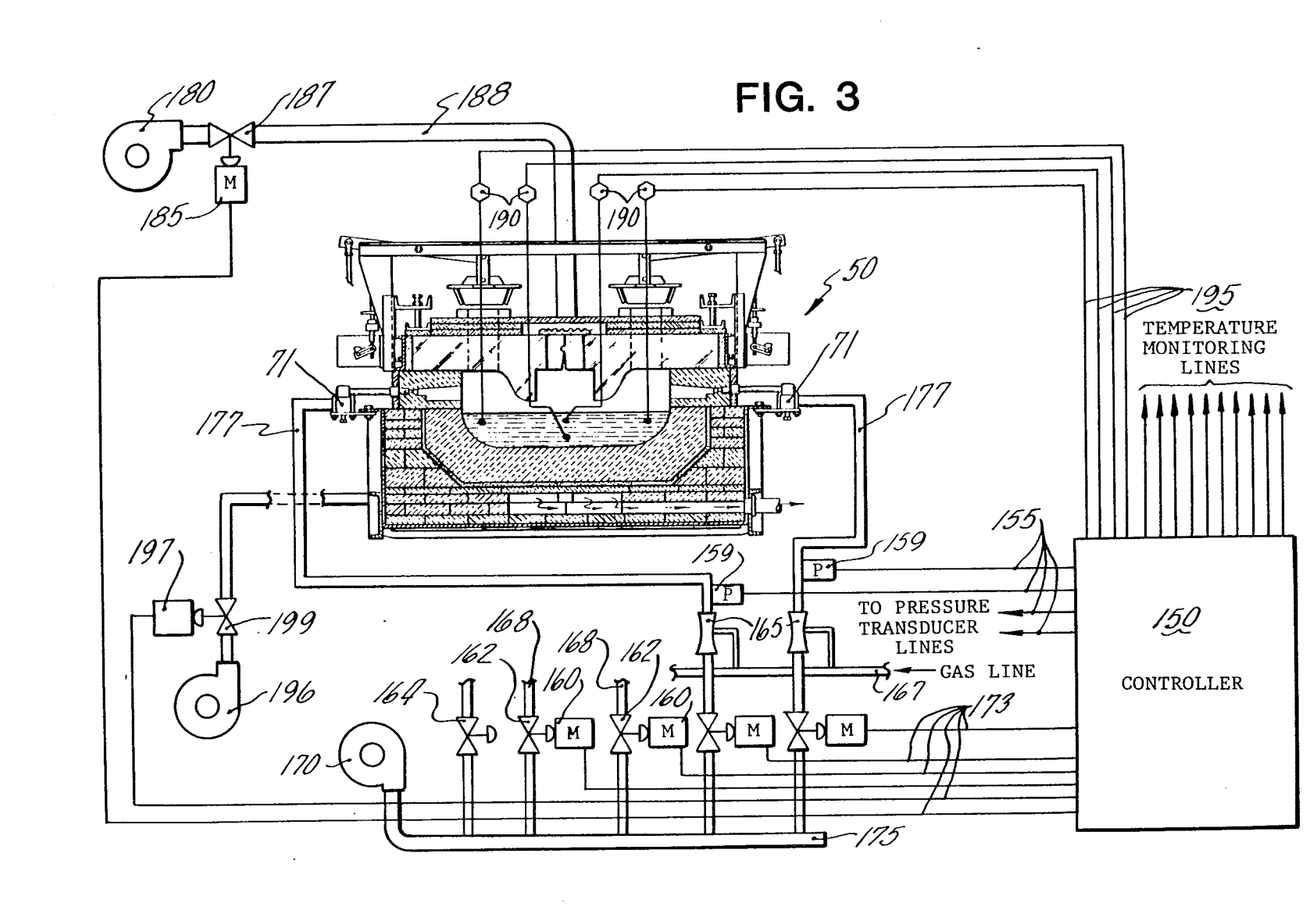
FIG. 3 is a partial schematic view of the temperature control system of FIG. 1, shown in relationship to the transverse forehearth section of FIG. 2.

Referring again to FIG. 2, a roof portion 67 of each cooling zone 60 and 62 includes opposed sides formed by burner blocks 68 in which are mounted gas fired burners 70 for heating the glass. As is conventional, these burners 70 are spaced along the length of cooling zones 60 and 62 on both sides of the forehearth 50. Burner manifolds 71 of burners 70 receive a mixture of air and combustion gas via infeed lines 177, the pressure of this mixture being monitored by pressure transducers 159 (FIG. 3). The air for this gas mixture is provided by a combustion air blower 170 via combustion air lines 175 with motorized valves 162, while the combustion gas is delivered from gas lines 167, via aspirators 165. Motorized air supply valves 162 represent one of a number of automated control points, enabling computer control of the fuel-air mixture to regulate the BTU input of the burners 70.

As best seen in FIG. 3, the illustrated embodiment of forehearth 50 utilizes a two-piece construction of forehearth roof blocks 72, including pieces 74 and 76 which are split along the median plane of forehearth 50. Roof block portions 74 and 76 include downward projections 78 and 80 which effectively subdivide channel 82 into central channel 86 and side channels 88 and 90. As further described below, this arrangement facilitates controlled heating and cooling of the molten glass.

Figure 1:
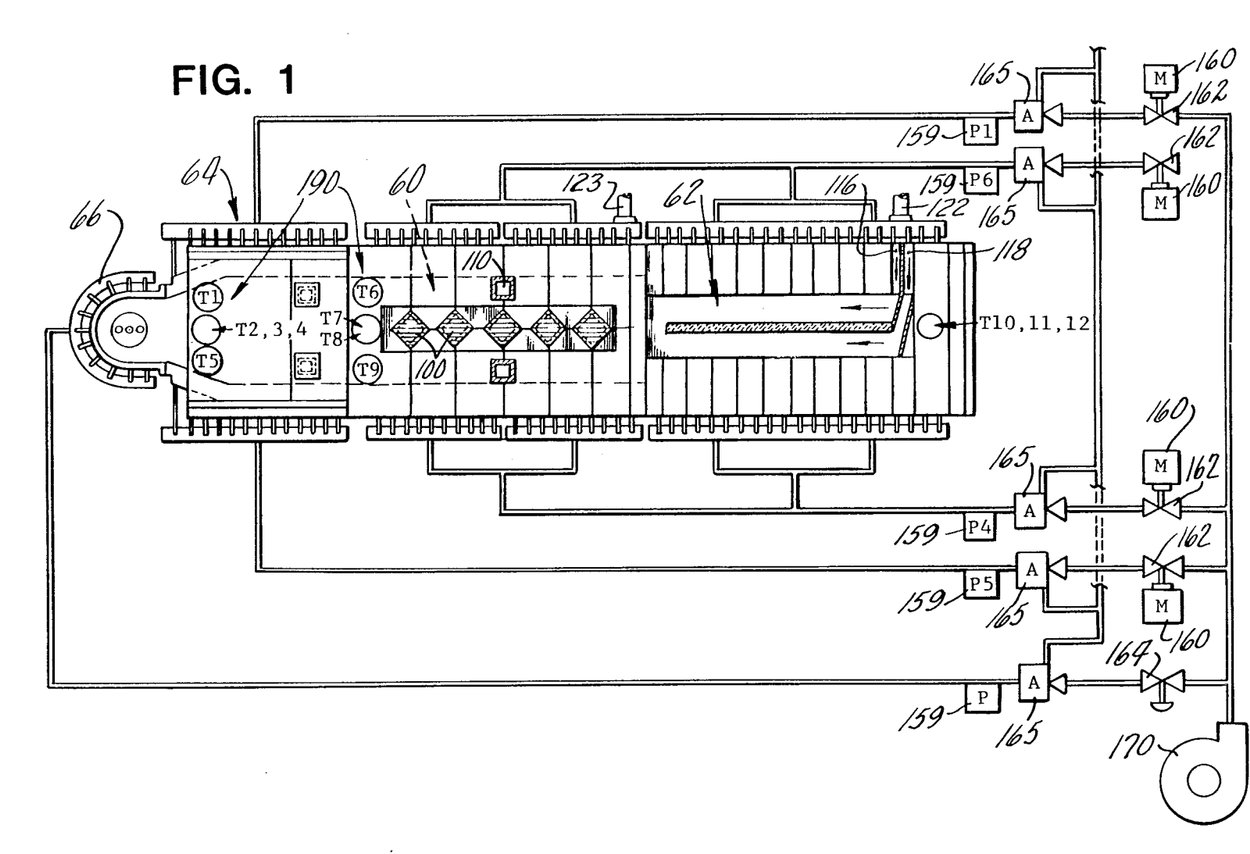
FIG. 1 is a somewhat schematic plan view of a glass forehearth with associated temperature control elements.

Various sources of cooling air are also shown in the drawings. With reference to FIG. 1, each of the cooling zones 60 and 62 has two flue openings 110, one communicating with one side channel 88 and the other with second side channel 90. Each of the flue openings is fitted with conventional damper blocks 112 (FIG. 3). Each of damper blocks 112 is independently adjustable by hand to provide the required degree of draft for the operation of the gas burners 70 and provide for the proper exhaustion of combustion products.

In the illustrated forehearth 50, bottom cooling is provided via a divided bottom cooling channel 114 in the insulating blocks 56 below the trough 52, said channel running longitudinally of the forehearth. A transverse channel 116 having a partition 118 therein to provide two flow paths is provided for the inlet of cooling air via inlet port 122 into the bottom cooling channel 114 (FIG. 1). Downstream of the inlet channel 116, a second transverse channel 120 communicates with the cooling channel 114 for the outlet of cooling air via port 123 (FIG. 1).

The illustrated structural design of forehearth 50 divides the cooling sections 60 and 62 into three longitudinal sectors, the central sector being subject to the cooling influence of the chamber 115 beneath refractory channel 52 (FIG. 3). The molten glass may be regarded as divided into side regions 132 and 134, and a central region which is itself subdivided into top section 135, bottom section 139, and middle section 137. Of these various sections, only the side sections 132 and 134 are influenced by the combustion system. The heating of the glass in these sections is by convention and by radiation from the roof blocks 74, 76. Any adjustments for the temperature set points for one of these areas will affect only that area. Each of these sections includes its own temperature sensing and control system, as discussed below.

The central chamber 86 extracts heat by radiation from the top central glass region 135, while the bottom channel 114 removes heat from region 139, such heat being conducted through refractory material 152. A temperature adjustment for region 115 will effect a smaller change for region 117, and similarly an adjustment for region 119 has a lesser affect in region 117. Applicant has observed that in actual operation a gradual linear temperature decline should be established for regions 132 and 134, with the areas 135 and 139 being more actively observed and controlled.

Reference should be had to FIG. 3, showing a forehearth section taken at the forward end of a cooling section. The temperature control devices for this section of forehearth 50 include an array of optical pyrometers or thermocouples T6, T7, T8, T9 respectively associated with the glass regions 132, 134, 135, and 139 (FIG. 2). The output signals from these temperature transducers are received by controller 150, which receives a number of such signals from sensors T6-T12 at the cooling sections 60, 62, as well as from temperature sensors T1-T5 at the equalizing section 64 (FIG. 1). In the illustrated embodiment, as further explained below, the outputs of temperature sensors T1, T5, T6, T7, T8, and T9 (control loop sensors) are incorporated in temperature control loops to regulate the thermal output of respective heating devices 71. Temperature sensors T2, T3, T4, T10, T11, and T12 (non-control loop temperature sensors) are not used for adaptive control, but merely to monitor temperatures for display to the operator.

Controller 150 also receives pressure transducer outputs P1, P5, P6, and P9 via lines 155, in order to monitor the internal pressure in the combustion air lines 177. These pressure sensor outputs are used for monitor and display purposes only. Although in the illustrated embodiment only temperature sensor outputs are used in the control loops, the invention could also be extended to include in the control loops the output of pressure sensors 159 or other non-temperature sensors (such as viscometers).

Controller 150 provides control signals regulating various motorized valves, including motors 160 controlling the feed of combustion air via valves 162 to the various burner manifolds 71; motor 185 controlling the flow of top cooling air from a blower 180 via valve 187; and motor 197 controlling the flow of bottom cooling air from blower 196 via valve 199. Note that FIG. 1 omits certain of the control devices for simplicity (i.e. those for providing top and bottom cooling air).

Figure 5:
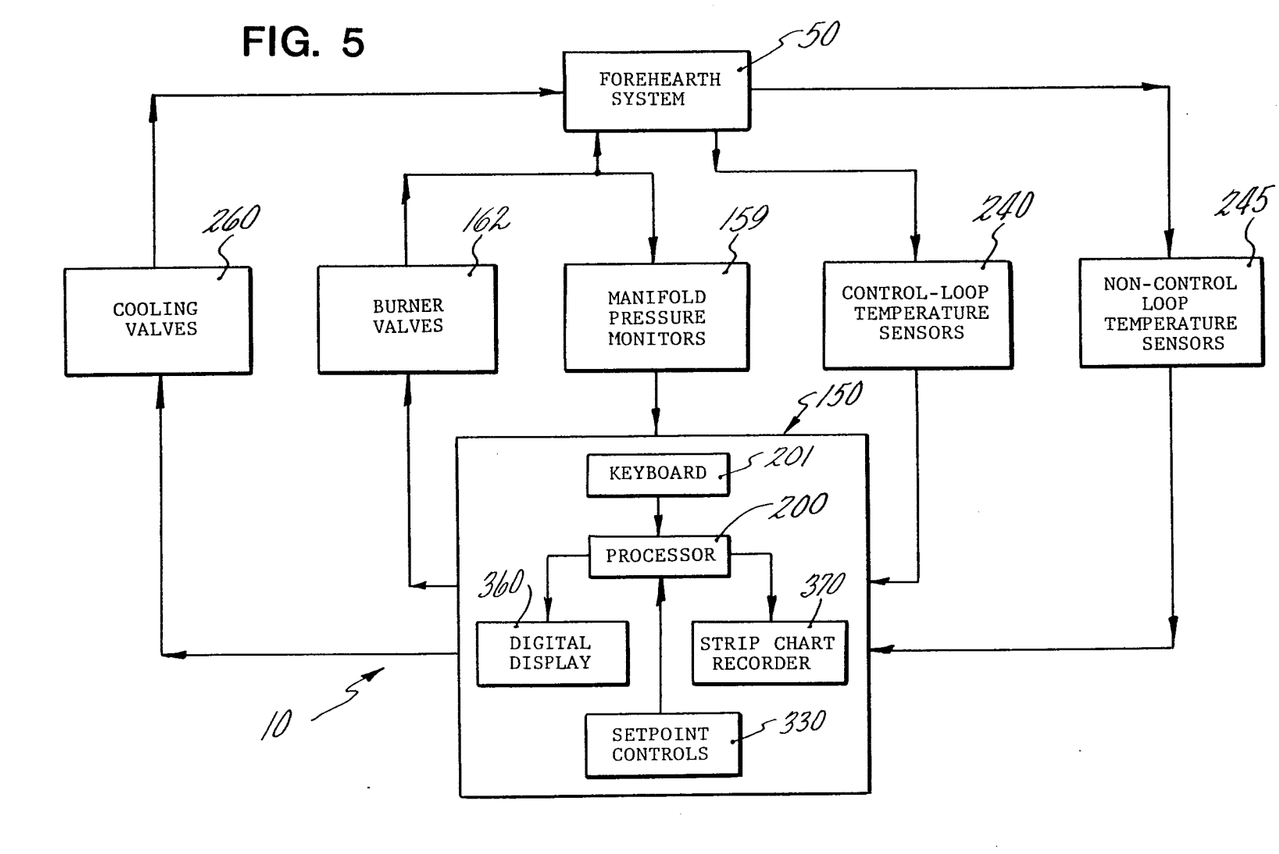
FIG. 5 is a functional block schematic diagram of a preferred multivariable control system.

FIG. 5 illustrates the functional relationship between the controller 150 and the various physical control devices shown in FIG. 2. Controller 150 includes processor 200 and various input/output devices, including keyboard 201, display 360, chart recorder 370, and set point input controls 330. Controller 150 receives various automatic inputs, including manifold pressure monitors 159, control-loop temperature inputs 240, and non-control-loop temperature inputs 245. Controller 150 outputs control signals to a plurality of burner valves 162 as well as cooling air valves 260. The manifold pressure monitors 159 and non-control loop temperature monitors 245 provide inputs to the controller 150 without compensating outputs designed to change these measured parameters.

Figure 6:
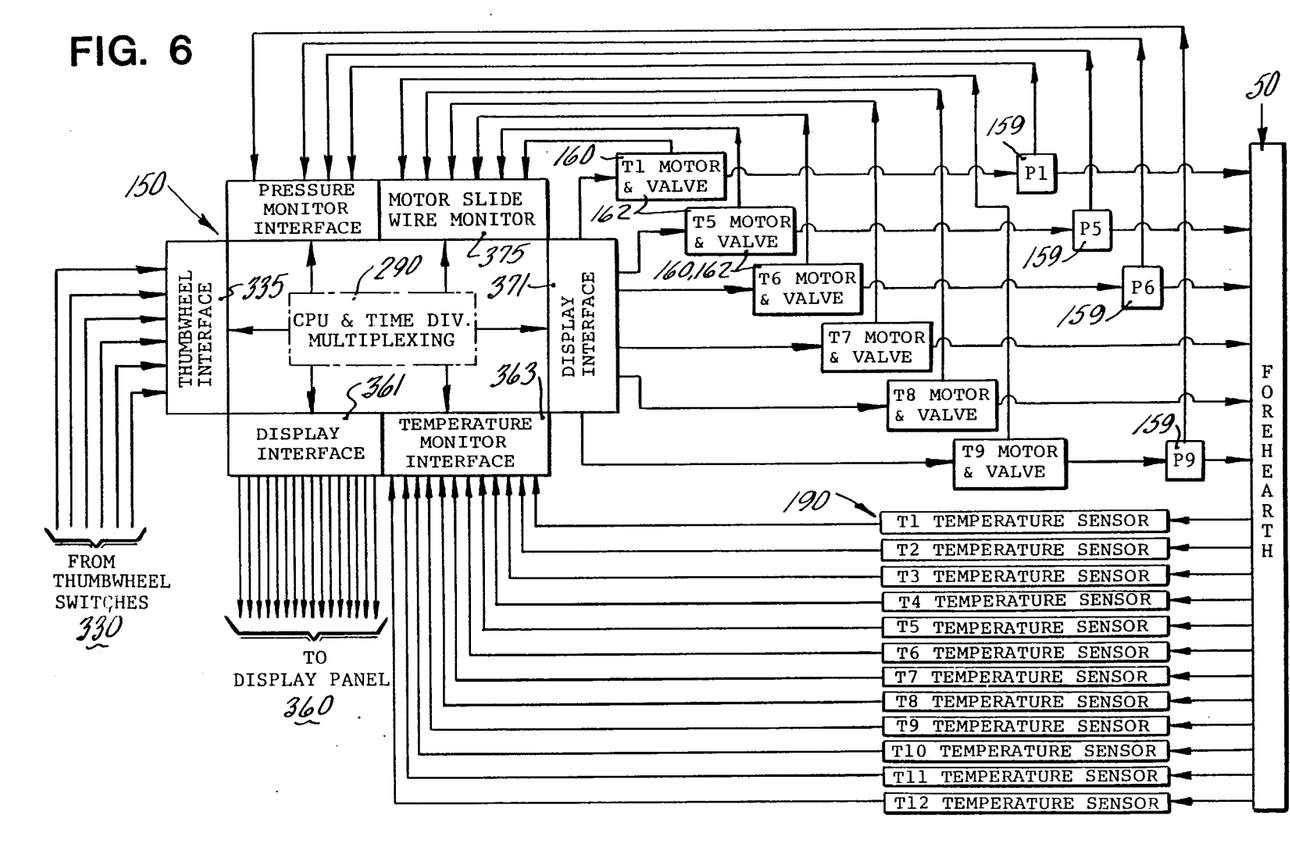
FIG. 6 is a schematic diagram of an illustrative control system for use with the forehearth of FIG. 1.

FIG. 6 shows the principal input/output interfaces of controller 150, together with their respective inputs and outputs. Thumbwheel interface 335 receives the operator thumbwheel settings indicating temperature set-points, while display interface 361 outputs temperature and pressure data to a display 360 based upon data received from temperature and pressure monitor interfaces 363, 365 (cf. FIG. 6). Temperature monitor interface 363 receives outputs from the various temperature transducers 190, and pressure monitor interface receives the output of pressure transducers 159. These monitor interfaces digitalize the analog outputs of the various transducers for further processing. Motor slide wire monitors 375 receive the analog output from the slide wires of valve motors 160, and digitalize the outputs to provide a predefined number of bits per degree of motor shaft rotation; note that the various motor, valve assemblies are associated with respective "control loop" temperature sensors. Computer system 150 provides output signals to motors 160 for clockwise or counterclockwise rotation, via motor deadband control 371.

Figure 7:
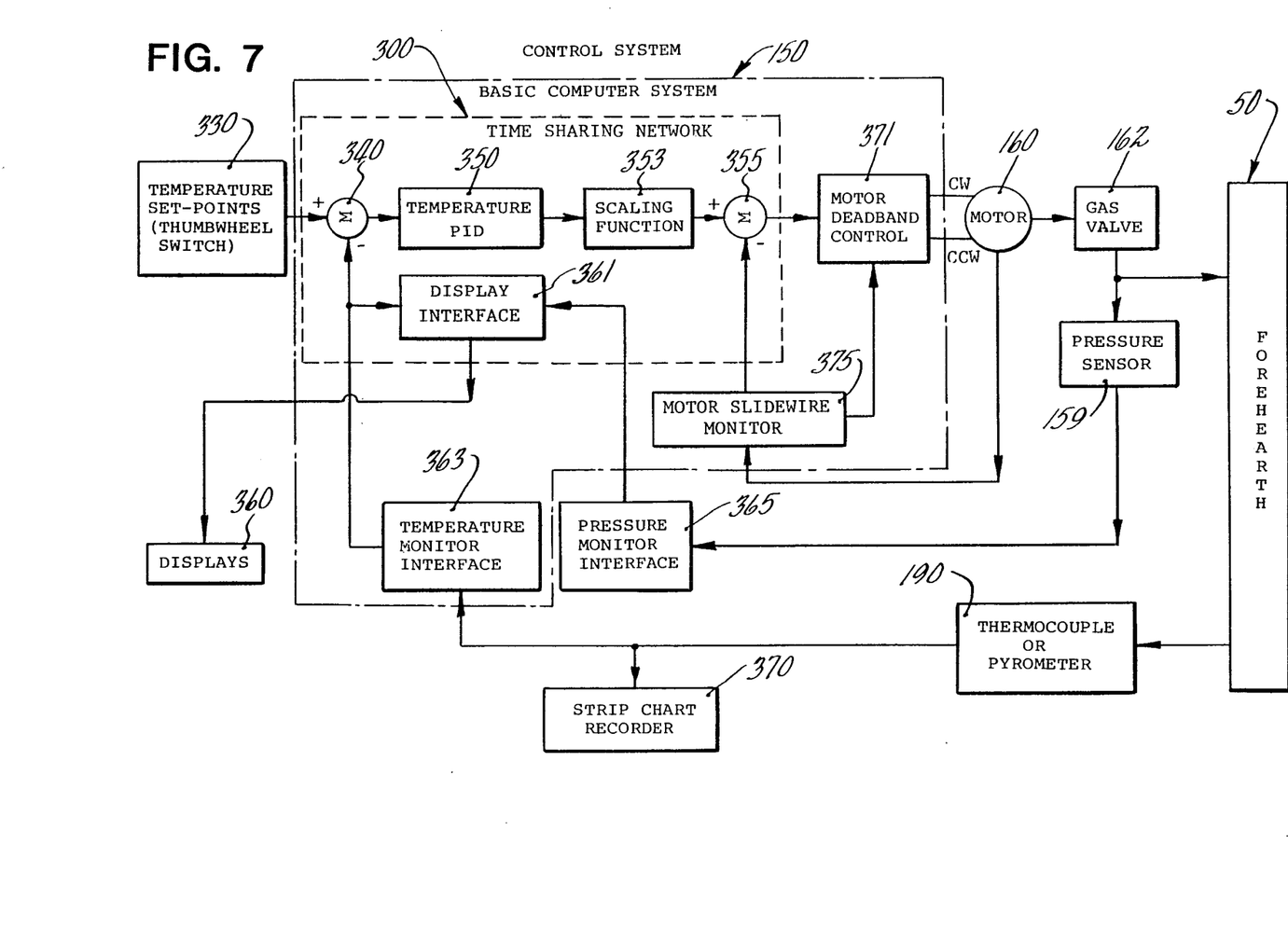
FIG. 7 is a schematic block diagram of the principal hardware elements of the control system of FIG. 6.

FIG. 7 provides a further schematic block diagram of the control system of the invention, showing the relationship of the input/output elements of FIG. 6 with the principal elements of a time sharing network 300. Summing network 340 receives the temperature set-point values from thumbwheel switches 330, and the digitalized temperature readings from temperature monitor interface 363 (for control-loop temperature sensors 240), and compares given pairs of these signals to output a difference signal to temperature PID controller 350. The latter assembly carries out a given temperature control algorithm having as its principal parameter the difference between the detected temperature and the corresponding set-point temperature for a given control-loop sensor. Other control algorithms known by skilled practicioners of the art may be employed at 350, such as ramp/soak, cascade, and least squares. The PID output is scaled at 353 and compared at summing network 355 with the digitalized output of motor slide wire monitor 375 taken from a corresponding motor 160. Any difference signal resulting from this comparison is processed by motor deadband control 371 which outputs a clockwise or counterclockwise rotate signal of appropriate magnitude (including zero).

In accordance with the present invention, the various operations within time-sharing network 300 are carried out over a plurality of sequential time segments collectively comprising a given control cycle. Each operating period is associated with a given temperature sensor 190 or pressure sensor 159. Thus, for example, during the period associated with control loop sensor T1 temperature monitor interface 363 will output this temperature output, summing network 340 will receive the corresponding set-point value, and the time sharing network will produce appropriate output signals for the associated motor 160 and valve 162. During a cycle associated with a non-control-loop temperature sensor 245, or with a pressure sensor 159, the output of the appropriate monitor interface is processed only by the display interface 361 (such display processing also occurs for control-loop sensors). Time sharing system 300 therefore has a variable output, which may be an output signal to a given motor deadband control 371, a display signal to a given portion of displays 360, or both.

Operationally, this time sharing network consists of a time division multiplexing system-CPU 290 which switches the respective input and output interfaces of controller 150 among the various sensor inputs and display and motor-drive outputs (FIG. 6). As seen in the timing diagram of FIG. 4, a clock establishes control cycles 390 (two are shown) each encompassing a prescribed number of clock pulses 392. Control cycle 390 is subdivided into sequential time segments 395, each associated with a given pressure or temperature sensor. Time segments 395 include both control loop segments 393, which are identified with both control loop sensors, and non-control-loop segments 394, identified with non-control-loop sensors. The timing cycle 390 may also include one or more time segments 397 during which no sensor output is processed by controller 150.

Figure 4:
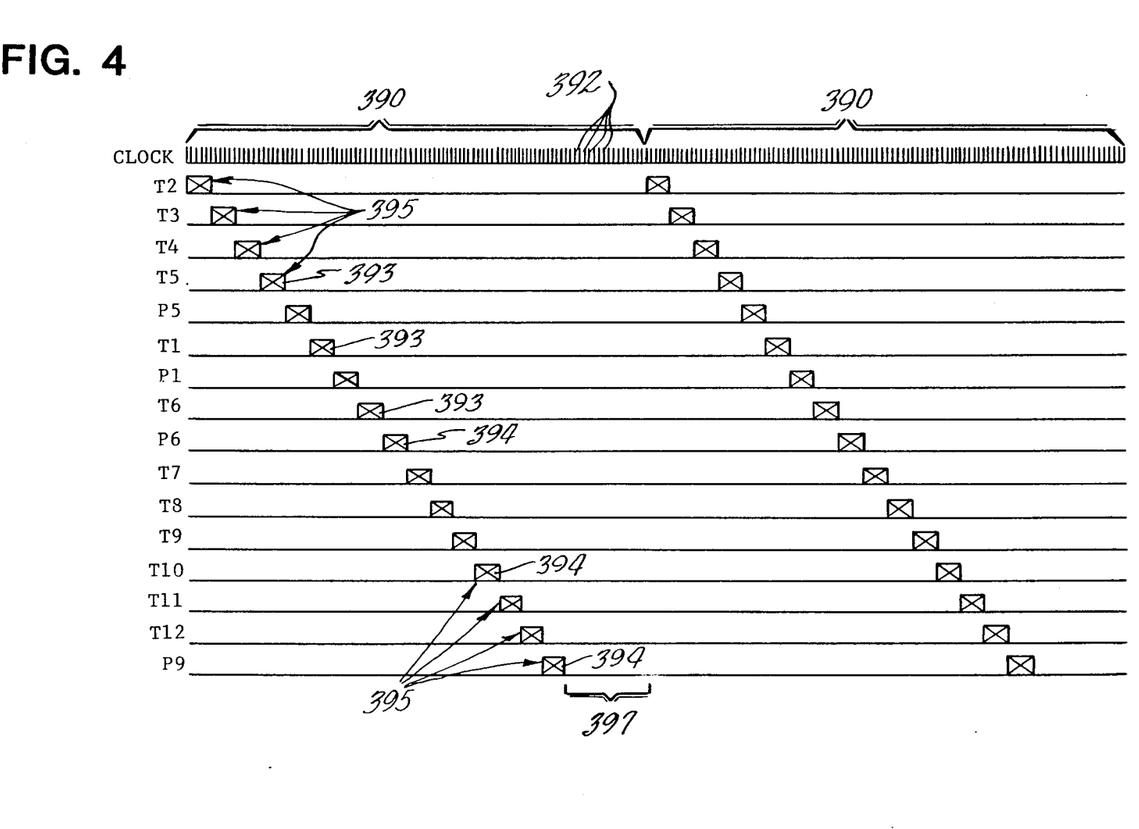
FIG. 4 is a timing chart of two successive control cycles of the controller of FIG. 7.

Motor deadband control 371 is outside of time sharing network, and hence will continue to influence the clockwise or counterclockwise rotation of a given motor 160 outside of the time-sharing period associated with that motor. Thus, a major adjustment in valve positioning may take place in real time over a number of control cycles. A control cycle duration on the order of magnitude of seconds to minutes has been found consistent with the processing speeds of commercial electronic components, yet short enough to provide an adequate sampling of sensor outputs in view of the real-time behavior of forehearth 50.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

I claim:

1. An improved electronic control system for controlling the temperature of a glass forehearth, said forehearth including an elongated refractory channel subdivided into a plurality of zones, wherein at least some of said zones each include (a) at least one variable output heater for locally heating molten glass flowing along the refractory channel, and (b) at least one temperature sensor, each associated with a given variable output heater for sensing local glass temperature and providing an output signal representative of the sensed temperature; said control system further including (c) temperature comparison means for processing the output signals of said temperature sensors to compare these with set point signals and for providing a heater adjustment signal based upon such comparison, (d) for each of the variable output heaters, a heater adjusting means operatively connected to said variable output heater for adjusting the heat output of said heater in response to a corresponding heater adjustment signal, and (e) means for transmitting the set point signals and the temperature sensor output signals to the temperature comparison means, and the heater adjustment signals from the temperature comparison means to each of the heater adjusting means, wherein the improvement comprises a time-division multiplexing apparatus for said control system comprising:

timing means for establishing a control cycle and a plurality of operating time segments within said control cycle, wherein at least some of said operating time segments ("control loop segments") are each identified with a respective temperature sensor, set point signal, and heater adjusting means; and multiplexing means for switching the operation of the transmitting means to route the respective temperature sensor output and set point signal to the temperature comparison means, and to route the resulting heater adjustment signal to the respective heater adjusting means, during each of the control loop segments of each control cycle.

2. A forehearth control system as defined in claim 1 wherein the forehearth includes non-control-loop sensors the outputs of which are not processed by said temperature comparison means and said heater adjusting means, and wherein the control system includes a display interface to control routing of information to an operator display, the timing means identifies each of the non-control loop sensors with respective non-control segments of the control cycle, and the multiplexing means routes the output of said non-control loop sensors to said display interface during the respective non-control loop segments.

3. A forehearth control system as defined in claim 1 wherein the control cycle is on the order of magnitude of seconds to minutes.

4. A forehearth control system as defined in claim 1 wherein said temperature comparison means includes means for producing a difference signal representative of the difference between said temperature sensor output signals and said set point signal, and control loop processing means for processing said difference signals to produce said heater adjustment signal.

5. A forehearth control system as defined in claim 4, wherein said forehearth also includes non-temperature sensors the outputs of which are not processed by said temperature comparison means and said heater adjusting means, and said control loop processing means also processes the output of predetermined non-temperature sensors during control loop segments to derive said heater adjustment signal.

6. A forehearth control system as defined in claim 1 further comprising adjustable cooling means for selectively cooling the glass in said refractory channel, wherein said control system further comprises means for adjusting said cooling means in response to output from at least one control loop sensor during cooling time segments within each control cycle.

7. An improved electronic control system for controlling the temperature of a glass forehearth, said forehearth including an elongated refractory channel subdivided into a plurality of zones, each of said zones including (a) at least one variable output heater for locally heating molten glass flowing along the refractory channel, and (b) at least one temperature sensor, each associated with a given variable output heater, for sensing local glass temperature and providing an output signal representative of the sensed temperature, wherein said control system compares the output signals of said temperature sensors with (c) set-point signals to provide heater adjusting signals to the variable output heaters and control the heat output of said heaters, wherein the improvement comprises a time-division multiplexing apparatus for said control system comprising:

timing means for establishing a real-time control cycle and a plurality of operating time segments within said control cycle, wherein at least some of said operating time segments ("control loop segments") are each identified with a respective (a) variable output heater, (b) temperature sensor, (c) set-point signal; and multiplexing means for switching operative connections in the control system of the variable output heaters, temperature sensors, and set point signals, to route the output of an identified temperature sensor and set point signal to the control system, and to route the resulting heater adjusting signal to an identified variable output heater, only during the respective control loop segment within each control cycle.

8. A forehearth control system as defined in claim 7, wherein the control system includes temperature comparison means for processing the output signals of said temperature sensors to compare these with set-point signals and for providing a heater adjustment signal based upon such comparison, and heater adjusting means for each of the variable output heaters for adjusting the heat output of each heater in accordance with a coresonding heater adjusting signal.

9. A forehearth control system as defined in claim 7 wherein the forehearth includes non-control-loop sensors the outputs of which are not processed by said control system to provide heater adjusting signals to the variable output heaters, and wherein the control system includes a display interface to control routing of informantion to an operator display, the timing means identifies each of the non-control-loop sensors with respective non-control-loop segments of the control cycle, and the multiplexing means routes the output of said non-control loop sensors to said display interface during the respective non-control loop segments.

10. A forehearth control system as defined in claim 7 wherein the control cycle is on the order of magnitude of seconds to minutes.

11. A forehearth control system as defined in claim 8, wherein said temperature comparison means includes means for producing a difference signal representative of the difference between said temperature sensor output signals and said set point signal, and control loop processing means for processing said difference signals to produce said heater adjustment signal.

12. A forehearth control system as defined in claim 11, wherein said forehearth also includes non-temperature sensors the outputs of which are not processed by said control system to provide heater adjusting signals to the variable output heaters, and said control loop processing means also processes the output of predetermined non-temperature sensors during control loop segments to derive said heater adjustment signal.

13. A forehearth control system as defined in claim 7 further comprising adjustable cooling means for selectively cooling the glass in said refractory channel, wherein said control system further comprises means for adjusting said cooling means in response to output from at least one control loop sensor during cooling time segments within each control cycle.

* * * * *